US011150867B2

(12) United States Patent
Sato et al.

(10) Patent No.: US 11,150,867 B2
(45) Date of Patent: Oct. 19, 2021

(54) MIXING CONSOLE

(71) Applicant: TEAC CORPORATION, Tokyo (JP)

(72) Inventors: Dai Sato, Tokyo (JP); Kazuhiko Endo, Tokyo (JP)

(73) Assignee: TEAC CORPORATION, Tokyo (JP)

( * ) Notice: Subject to any disclaimer, the term of this patent is extended or adjusted under 35 U.S.C. 154(b) by 0 days.

(21) Appl. No.: 16/799,235

(22) Filed: Feb. 24, 2020

(65) Prior Publication Data

US 2021/0124553 A1    Apr. 29, 2021

(30) Foreign Application Priority Data

Oct. 24, 2019   (JP) .............................. JP2019-193556

(51) Int. Cl.
*G06F 3/16* (2006.01)
*G06F 3/0484* (2013.01)
*H04H 60/04* (2008.01)

(52) U.S. Cl.
CPC .......... *G06F 3/165* (2013.01); *G06F 3/04847* (2013.01); *H04H 60/04* (2013.01)

(58) Field of Classification Search
CPC ... H04R 2420/01; H04S 7/30; H04S 2400/13; G10H 1/46; H03F 3/181; H03G 3/00; H03G 3/3005
USPC ....................................................... 381/119
See application file for complete search history.

(56) References Cited

U.S. PATENT DOCUMENTS

| | | | | |
|---|---|---|---|---|
| 2007/0058823 A1* | 3/2007 | Terada | ..................... | H04R 5/04 381/119 |
| 2008/0219478 A1* | 9/2008 | Aoki | ...................... | H04H 60/04 381/119 |
| 2009/0304207 A1* | 12/2009 | Cooper | .................... | G10H 1/08 381/119 |
| 2012/0020498 A1 | 1/2012 | Fujita et al. | | |
| 2016/0142165 A1 | 5/2016 | Nishikori et al. | | |

FOREIGN PATENT DOCUMENTS

| | | |
|---|---|---|
| JP | 5495130 B2 | 5/2014 |
| JP | 6515496 B2 | 5/2019 |

* cited by examiner

*Primary Examiner* — Kile O Blair
(74) *Attorney, Agent, or Firm* — Seed IP Law Group LLP

(57) ABSTRACT

A mixing console is disclosed which enables temporary operation and display of channels of different layers with a simple operation. A digital mixing console includes a channel strip portion that has a plurality of channel strips having an operator which adjusts a parameter value for controlling an audio signal, and a layer setter that divides the channel strip portion into a plurality of blocks and sets layer data which define a channel to be operated and to be displayed for each of the blocks. When one or more processors detect an operation of FIX LAYER button which prohibits switching of the layer data to fix the layer data for each of the blocks, the one or more processors fix the layer data of the corresponding block.

12 Claims, 9 Drawing Sheets

MIXING CONSOLE

CROSS REFERENCE TO RELATED APPLICATION

This application claims priority to Japanese Patent Application No. 2019-193556 filed on Oct. 24, 2019, which is incorporated herein by reference in its entirety including the specification, claims, drawings, and abstract.

TECHNICAL FIELD

The present disclosure relates to a mixing console which applies a mixing process on audio signals.

BACKGROUND

In a mixing console, in many cases, an operation panel having a small number of operators is used with respect to an operation target channel. In this case, a method is employed in which an operator block is made into layers in software, and the layers are switched to correspond to the operations. As a method of switching the layers, methods are proposed in which a group of layer switching buttons are equipped in a product as a whole, a group of the layer switching buttons are equipped for each of the plurality of operator blocks, or the like.

JP 5495130 B discloses an acoustic signal processing apparatus comprising: a channel strip portion having a plurality of channel strips having operators for adjusting values of various parameters for controlling acoustic signal processing; a first memory region for placing data which define channels to be assigned respectively for all of the plurality of channel strips of the channel strip portion; a second memory region for placing data which define channels to be assigned respectively to an arbitrary channel strip of the plurality of channel strips of the channel strip portion; a third memory region for placing data which define channels to be assigned respectively to an arbitrary channel strip of the plurality of channel strips of the channel strip portion; assignment means that assigns a channel based on the data placed in the third memory region for a channel strip for which a channel to be assigned is defined by the data placed in the third memory region, that assigns a channel based on the data placed in the second memory region for a channel strip for which the channel to be assigned is not defined by the data placed in the third memory region, but is defined by the data placed in the second memory region, and that assigns a channel based on the data placed in the first memory region for a channel strip for which the channel to be assigned is defined by neither the data placed in the third memory region nor the data placed in the second memory region; a release operator; and release execution means that, when the release operator is operated, clears all data in the third memory region and again executes assignment when the assignment has been done based on the data placed in the third memory region, that clears all data in the second memory region and again executes assignment when the assignment based on the data placed in the third memory region has not been done and the assignment has been done based on the data placed in the second memory region, and that does not clear any of the memory regions and maintains the assignment when the assignment based on the data placed in the second memory region and the assignment based on the data placed in the third memory region have not been done. This document also discloses a fix layer. The fix layer refers to a layer primarily for fixing to a desired channel strip a desired channel for which monitoring at all times or frequent adjustment is desired by a user. The user can arbitrarily produce fix layer data which are data defining the assignment of the channel to each channel strip in the channel strip portion. In the definition in the fix layer data, a channel strip may be present for which no channel is assigned. For example, when a vocal sound is assigned to an input channel 22, and the user desires to fixedly operate this channel with a channel strip 1, fix layer data may be produced which defines that the input channel 22 is assigned to the channel strip 1, and no channel is assigned to the other channel strips 2~8, and may be placed in the fix layer. The fix layer data and the above-described custom layer data are similar in that the data allow the user to arbitrarily define the assignment of the channel, but differ from each other in the layer to be placed. As already described above, when the fix layer data are produced, one channel set group may be assigned to one channel strip as one assignment unit.

JP 6515496 B discloses a mixing console comprising: an operation panel having a plurality of channel strips wherein each of audio signals of a plurality of channels is controlled by one of the plurality of channel strips to which one of the plurality of channels is assigned for processing the audio signal, and each of the channel strips has operators which can be operated by the user and which controls an audio signal of one channel assigned to the channel strip; a plurality of operation divisions formed by dividing the operation panel into a plurality of divisions, wherein a plurality of different channel strips of the plurality of channel strips belong to each operation division according to the dividing of the operation panel, and a plurality of channels are assigned to each operation division corresponding to the channel assignment for the plurality of channel strips belonging to the operation division; a channel selector provided for each of the plurality of operation divisions and that selects one of the plurality of channels assigned to the operation division corresponding to the channel selector; and a plurality of adjusters provided corresponding to the plurality of operation divisions, wherein each adjuster is configured to adjust, according to a user operation, a plurality of parameters for signal processing on an audio signal of one channel selected by the channel selector provided in the operation division corresponding to the adjuster.

There is also proposed a "custom layer" with which a user can freely assign a channel, in order to enable simultaneous operation of channels of different layers. However, in the custom layer, first, a setting screen must be called, and a desired channel to be assigned to the layer must be separately set in the setting screen, resulting in complexity of the operation. Therefore, there is a desire to more simply edit the layers without using the custom layer, and to display, on the console, the channels in different layers for operation.

An advantage of the present disclosure lies in provision of a mixing console which allows temporary operation and display of channels in different layers, with a simple operation.

SUMMARY

According to one aspect of the present disclosure, there is provided a mixing console which processes an audio signal in a plurality of channels, the mixing console comprising: a channel strip portion that includes a plurality of channel strips having an operator which adjusts a parameter value for controlling an audio signal; a layer setter that divides the channel strip portion into a plurality of blocks and that sets layer data which define a channel to be operated and to be displayed for each of the blocks; and a layer fixer that prohibits switching of the layer data to fix the layer data for each of the blocks.

According to another aspect of the present disclosure, the channel strip portion is divided into at least a first block and a second block, and the layer fixer switches the layer data of the first block and the second block according to an operation of the layer setter when the first block and the second block are not fixed; switches only the layer data of the second block according to an operation of the layer setter when the first block is fixed; and switches only the layer data of the first block according to an operation of the layer setter when the second block is fixed.

According to another aspect of the present disclosure, the layer setter comprises: an input channel setter which sets an input channel to the first block and the second block; and an output channel setter which sets an output channel to the first block and the second block, and the layer fixer switches the layer data of the first block and the second block according to an operation of the layer setter when the first block and the second block are not fixed; switches only the layer data of the second block to an output channel setting according to an operation of the output channel setter when the first block is fixed to the input channel setting; and switches only the layer data of the first block to an input channel setting according to an operation of the input channel setter when the second block is fixed to the output channel setting.

According to another aspect of the present disclosure, the layer fixer switches the layer data of the first block and the second block according to a scroll operation of a user when the first block and the second block are not fixed; switches only the layer data of the second block according to the scroll operation when the first block is fixed to the input channel setting; and switches only the layer data of the first block according to the scroll operation when the second block is fixed to the output channel setting.

According to the present disclosure, with a simple operation, channels of different layers, for example, an input channel and an output channel, can be temporarily operated and displayed together.

BRIEF DESCRIPTION OF DRAWINGS

Embodiment(s) of the present disclosure will be described based on the following figures, wherein.

DESCRIPTION OF EMBODIMENTS

An embodiment of the present disclosure will now be described with reference to the drawings. In the description of the embodiment of the present disclosure, a digital mixing console is exemplified.

Figure 1:
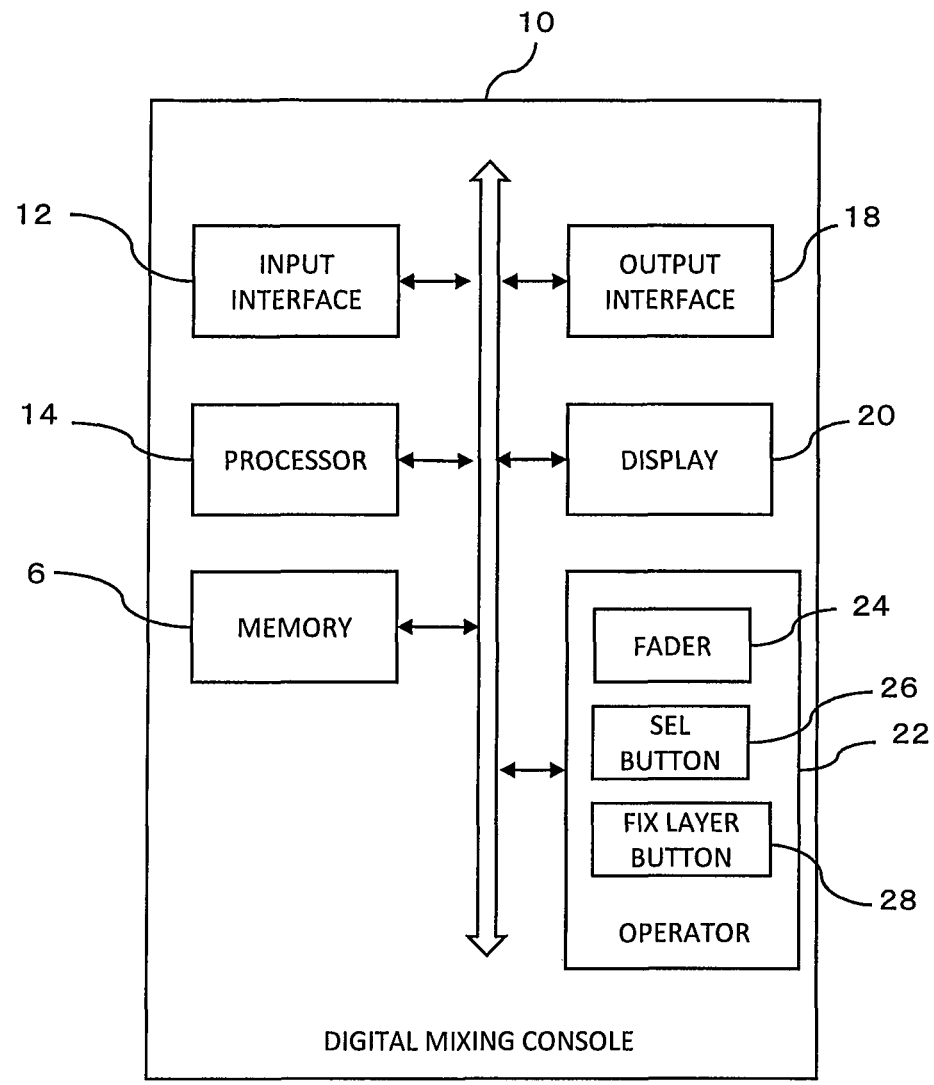
FIG. 1 is a structural block diagram of an embodiment of the present disclosure.

FIG. 1 is a structural block diagram of a digital mixing console according to an embodiment of the present disclosure. A digital mixing console 10 applies processes such as routing, assigning, echo rising, mixing, and effect on various input audio signals, and outputs the processed signal to outside.

The digital mixing console 10 comprises an input interface 12, one or more processors 14, a memory 16, an output interface 18, a display 20, and an operator 22.

The input interface 12 includes an analog signal input terminal, a digital signal input terminal, and an ADC (analog-to-digital converter). An analog audio signal is converted into a digital audio signal by the ADC and the converted signal is then input.

The one or more processors 14 are formed from a CPU or the like, and execute various processes by reading and executing a process program stored in the memory 16. Various processes of the processor 14 include:

assigning an input audio signal or an output audio signal to a channel strip;

dividing a channel strip portion into a plurality of blocks, and setting and switching layer data for each block; and prohibiting switching of the layer data for each block and fixing the layer according to a user operation.

The display 20 displays various states of the digital mixing console. The display 20 is formed from a liquid crystal panel, an organic EL panel, or the like.

The operator 22 is a group of switches and buttons operated by the user for executing various processes on the input audio signal; specifically, the routing process, the assignment process, the echo rising process, the mixing process, and the effect process. For example, the display 20 may be formed by a touch panel, and the operator 22 may be displayed on the touch panel to allow a touch operation, or physical switches, buttons, knobs, or the like may be employed. The operator 22 includes a fader 24, a select (SEL) button 26, and a fix layer (FIX LAYER) button 28. The fader 24 adjusts input and output levels of the audio signal assigned to the channel strip, and includes a linear fader or a rotary fader. The SEL button 26 is a button for the user to select a desired channel strip or a desired group of channel strips. The FIX LAYER button 28 is a button for the user to fix the layer. In addition, a layer switching button for switching the layers is included in the operator 22.

The one or more processors 14 process the audio signal according to the operation of the fader 24 or the like included in the operator 22. That is, parameter value(s) which are set by the operation of the operator 22 are stored in the memory 16 formed from a flash memory or the like. Various signal processes executed in the digital mixing console 10 are executed according to parameter value(s) stored in the memory 16.

Here, the one or more processors 14 may include a CPU which controls an overall operation of the digital mixing console 10, and a DSP which executes the mixing process, the effect process, a volume level control process, or the like of the audio signal by executing a processing program based on an instruction of the CPU.

The DSP connects an input audio signal to an input channel. A number of the input channels is arbitrary, and may be, for example, 40 channels, including ch. 1 to ch. 40. In each input channel, a level control process, an echo rising process, or the like is executed based on set parameter value(s). The audio signal of each input channel is selectively output to a mix (MIX) bus, and the MIX bus applies a mixing process to the audio signal which is input from the input channel. A level of the audio signal which is output from the input channel to the MIX bus can be individually adjusted. The mixing-processed audio signal is output to an output channel. A number of the output channels is also arbitrary, and may be, for example, 22 channels, including MIX1 to MIX22. At the output channel, various processes on an output side are executed according to the set parameter value(s). An output audio signal from the output channel is output to the output interface 18.

The output interface 18 includes an analog output terminal, a digital output terminal, and a DAC (digital-to-analog converter). The processed digital audio signal is converted into an analog audio signal by the DAC and the converted signal is then output.

Figure 2:
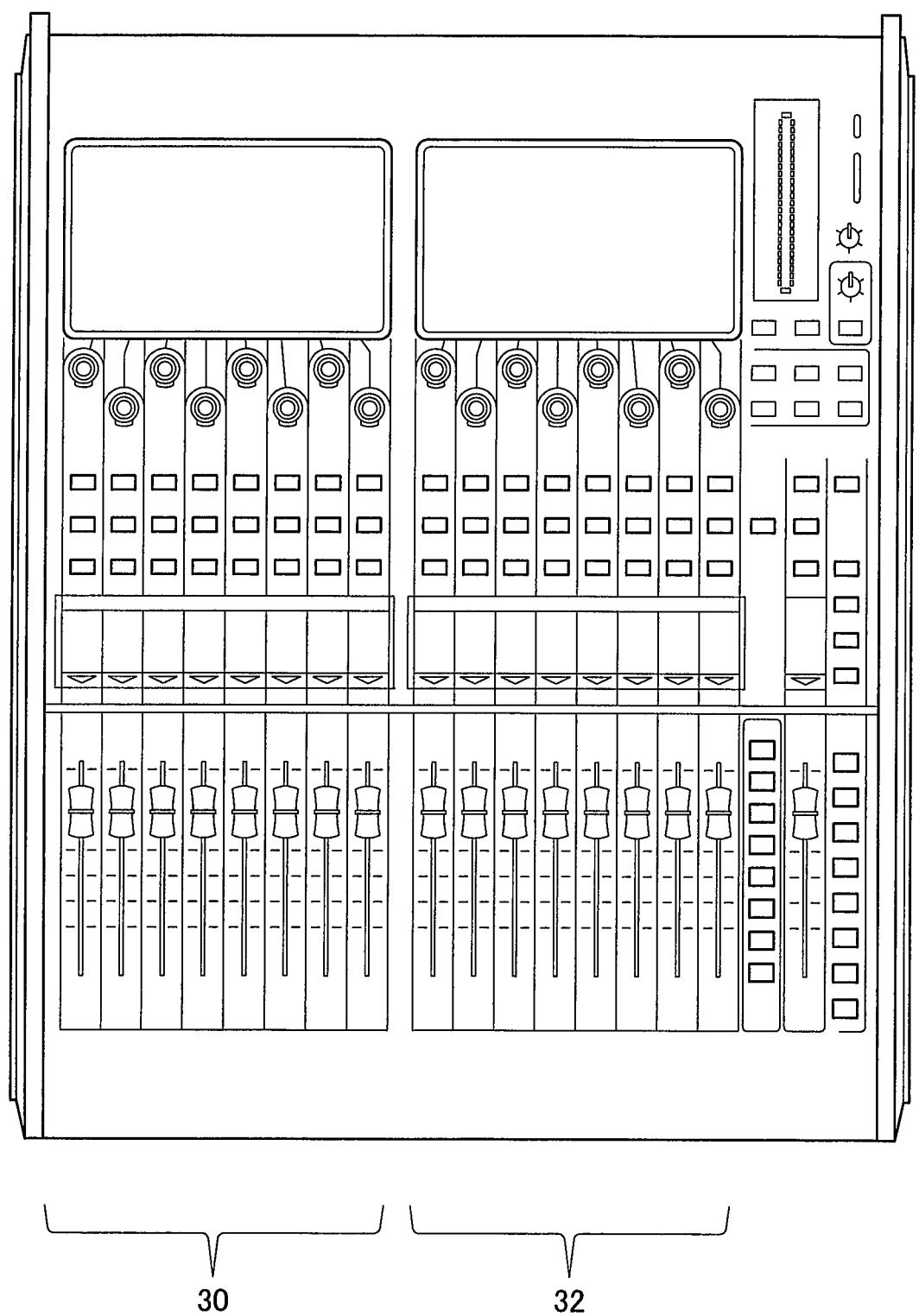
FIG. 2 is an outer view of an operation panel according to an embodiment of the present disclosure.

FIG. 2 shows an outer view of the digital mixing console 10.

At an approximate center part of the digital mixing console 10, a plurality of channel strips elongated in a vertical direction are provided. A channel strip portion formed from a plurality of (in the figure, a total of 16) channel strips is divided into a plurality of blocks. In the figures, 8 channel strips are provided in a block 30 at the left, and 8 channel strips are provided in a block 32 at the right. In one channel strip, a rotary encoder, various buttons, and the fader (electricity-driven fader) 24 are provided as the operator 22. At an upper part of the channel strip, the display 20 is provided. The display 20 displays states of the channel strips. The display 20 is provided in correspondence to the block 30 and the block 32.

Further, at a right side of the digital mixing console 10, various buttons are provided as the operator 22.

Figure 3:
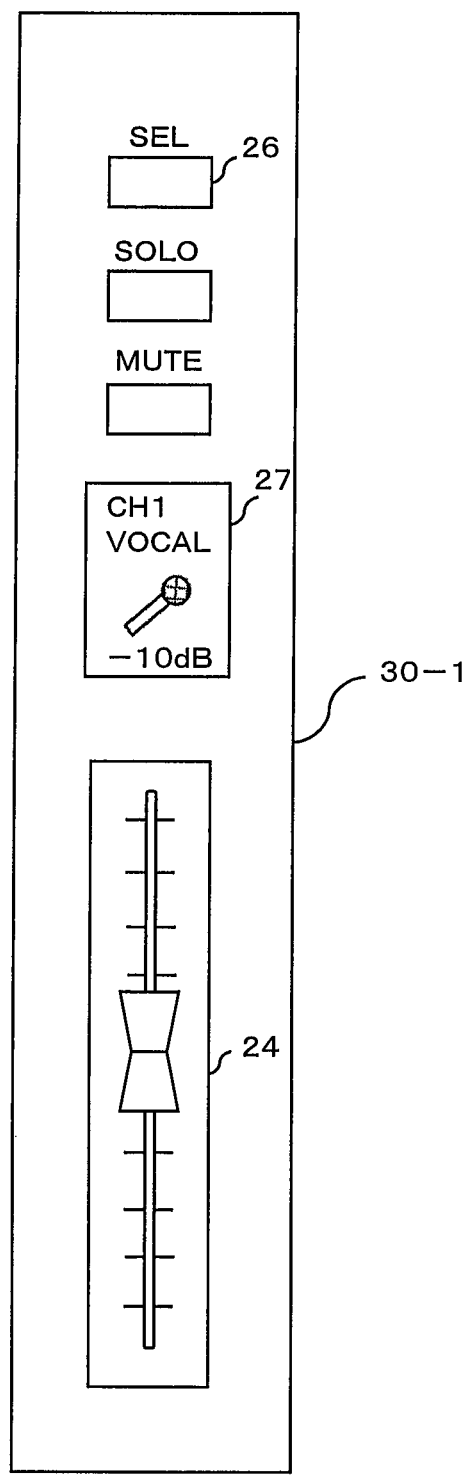
FIG. 3 is an explanatory diagram of a channel strip in an embodiment of the present disclosure.

FIG. 3 schematically shows one channel strip 30-1 of the left block 30.

The channel strip 30-1 includes the select (SEL) button 26, a solo (SOLO) button, a mute (MUTE) button, a channel screen 27, and the fader (electricity-driven fader) 24.

The SEL button 26 is a button which is operated by the user when the user selects a desired channel strip. When the user operates the SEL button, the one or more processors 14 display a parameter setting screen of the corresponding channel strip on the display 20.

The SOLO button and the MUTE button are both known. Briefly, the SOLO button is a button operated by the user when the user sets a desired channel strip to a solo state. The SOLO button is, for example, a toggle button, and with ON/OFF operations thereof, a solo state/a released state are switched. The MUTE button is a button operated by the user when the user sets a desired channel strip to a non-sound state. The MUTE button is, for example, also a toggle button, and with ON/OFF operations thereof, a no-sound state/a released state are switched.

The channel screen 27 displays a current setting state of the channel strip 30-1. The current setting state includes, for example, a channel name which is set by the user, an icon which is set by the user, a setting value of the fader 24, or the like. In the figures, the channel strip 30-1 is ch. 1, vocal (VOCAL) is set for this channel as the channel name which is set by the user, and an icon of the vocal (icon of a microphone) is displayed. In addition, "−10 dB" is displayed as the current setting value of the fader 24. When the user operates the fader 24, the display changes according to an operation value.

The fader (electricity-driven fader) 24 is a linear fader, and, by the user operating the fader 24 in the up-and-down direction, a level of an audio signal assigned to ch. 1 (here, the vocal signal) is adjusted.

Figure 4:
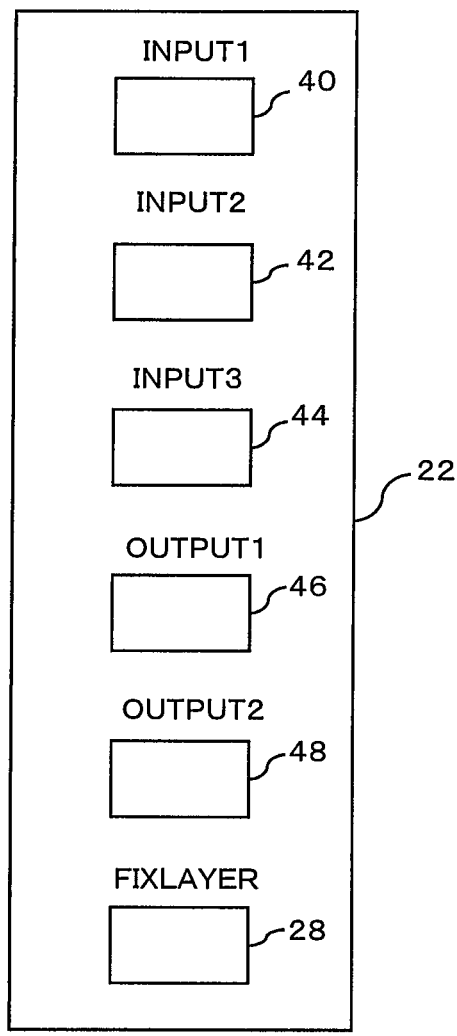
FIG. 4 is an explanatory diagram of a user operation button in an embodiment of the present disclosure.

FIG. 4 schematically shows the operator 22 provided at a right side of the digital mixing console 10.

The operator 22 includes layer switching buttons 40~48, and the FIX LAYER (fix layer) button 28. The layer switching buttons 40~48 include INPUT1, INPUT2, and INPUT3 for switching the input channel, and OUTPUT1 and OUTPUT2 for switching the output channel. To INPUT1~INPUT3 and OUTPUT1~OUTPUT2, layer data are assigned for each block in advance and stored in the memory 16, and the user can switch the layer by operating these buttons.

For example, in a default state, for each of the block 30 (hereinafter, this block will be referred to as block #1) and the block 32 (hereinafter, "block #2"), the layer data as described below are set and stored in the memory 16.

<INPUT1>
Block #1: ch. 1~ch. 8
Block #2: ch. 9~ch. 16
<INPUT2>
Block #1: ch. 17~ch. 24
Block #2: ch. 25~ch. 32
<INPUT3>
Block #1: ch. 33~ch. 40
Block #2: STIN/FXRTN
<OUTPUT1>
Block #1: MIX1~MIX8
Block #2: MIX9~MIX16
<OUTPUT2>
Block #1: MIX17~MIX22
Block #2: NONE Here, ch. 1~ch. 40 are input channels, and MIX1~MIX22 are output channels. When the one or more processors 14 detect an operation, by the user, of the layer switching buttons 40~48, the one or more processors 14 switch the layer data and set the channel strip to be operated and to be displayed according to the operation.

More specifically, when the user operates the INPUT1 among the layer switching buttons 40~48, input channels ch. 1~ch. 8 are displayed in 8 channel strips of the block #1, and input channels ch. 9~ch. 16 are displayed in 8 channel strips of the block #2, so that ch. 1~ch. 16 are set as the channels to be operated and to be displayed. When the user operates the OUTPUT1, output channels MIX1~MIX8 are displayed in 8 channel strips of the block #1, and output channels MIX9~MIX16 are displayed in 8 channel strips of the block #2, so that MIX1~MIX16 are set as the channels to be operated and to be displayed. When the user wishes to operate and display the input channel, the user may operate one of the INPUT1~INPUT3, and when the user wishes to operate and display the output channel, the user may operate one of the OUTPUT1~OUTPUT2.

In addition, in a state where the user operates the INPUT1, ch. 1~ch. 8 are displayed in the block #1, and ch. 9~ch. 16 are displayed in the block #2, if the user then operates the OUTPUT1, the one or more processors 14 switches the layer according to this operation, displays the MIX1~MIX8 in the block #1 and the MIX9~MIX16 in the block #2, and sets MIX1~MIX16 as the channels to be operated and to be displayed.

In this manner, the user can selectively set one of the input channel and one of the output channel as the channels to be operated and to be displayed by operating the layer switching buttons 40~48.

On the other hand, the user may wish to temporarily display channels of different layers on the same screen and set the channels as the operation target. Specifically, the user may wish to display output channels MIX9~MIX16 in the block #2 while displaying the input channels ch. 1~ch. 8 in the block #1.

In this case, the default layer data may be transitioned to a custom layer which can be edited by the user, and a layer may be newly produced and may be stored in the memory such as:

<Custom Layer 1>
Block #1: ch. 1~ch. 8
Block #2: MIX9~MIX16.

However, assignment of channels to the blocks must be set from a setting screen, which would result in complexity of the operation.

In consideration of this, in the present embodiment, in order to temporarily operate and display channels of different layers in a manner simpler than the custom layer, a configuration is employed in which the layer may be fixed for each block. A button for this purpose is the FIX LAYER button 28. When the user operates the FIX LAYER button 28, and then operates the SEL button 26 of the block for which the layer is to be fixed, the one or more processors 14 detect this sequence of button operations, and fix the layer of the corresponding block selected by the SEL button 26. Here, the description of "fixing the layer of the corresponding block" means that the layer data of the corresponding block are not switched even with the operation of the layer switching buttons 40~48 and the current layer data are maintained. Therefore, for example, when the FIX LAYER button 28 is operated and the SEL button 26 for the channel strip 30-1 belonging to the block #1 is then operated, the current layer of the block #1 is fixed, and even if the user operates the INPUT1~INPUT3 or the OUTPUT1~OUTPUT2 after the fixation, only the layer of the block #2 is switched according to the operation of the INPUT1~INPUT3 or the OUTPUT1~OUTPUT2, and the layer of the block #1 is maintained.

More specifically, when the user operates the INPUT1 among the layer switching buttons 40~48, according to the default layer data, the following is displayed and is set as the operation target:
Block #1: ch. 1~ch. 8
Block #2: ch. 9~ch. 16.

Then, when the user operate the FIX LAYER button 28 and operates the SEL button 26 of one of the channel strips belonging to the block #1, the layer data of the block #1 is fixed with:
Block #1: ch. 1~ch. 8.

In this state, when the user operates the OUTPUT1 among the layer switching buttons 40~48, the following is displayed according to the default layer data:
Block #2: MIX9~MIX16.

When the layer data of the block #1 are fixed, even when the layer switching buttons 40~48 are operated, the one or more processors 14 apply a process, regarding the layer data of the block #1 indicated by the layer switching button as invalid, and regarding only the layer data of the block #2 as valid. In this process, the following state is achieved:
Block #1: ch. 1~ch. 8
Block #2: MIX9~MIX16.

Therefore, channels of different layers may be temporarily set as the channels to be operated and to be displayed, with a very simple operation.

Alternatively, when the user operates the OUTPUT1 among the layer switching buttons 40~48, the following is displayed and set as the operation target according to the default layer data:
Block #1: MIX1~MIX8
Block #2: MIX9~MIX16.

Then, when the user operates the FIX LAYER button 28 and subsequently operates the SEL button 26 of one of channel strips belonging to the block #2, the layer data of the block #2 are fixed with:
Block #2: MIX9~MIX16.

In this state, if the user operates the INPUT2 among the layer switching buttons 40~48, the following is displayed according to the default layer data:
Block #1: ch. 17~ch. 24.

When the layer data of the block #2 are fixed, even when the layer switching buttons 40~48 are operated, the one or more processors 14 apply a process, regarding the layer data of the block #2 indicated by the layer switching buttons 40~48 as invalid, and regarding only the layer data of the block #1 as valid. That is, the following state is achieved:
Block #1: ch. 17~ch. 24
Block #2: MIX9~MIX16.

Thus, channels of different layers may be temporarily set as the channels to be operated and to be displayed, with a very simple operation.

Similar to the SOLO button and the MUTE button, the FIX LAYER button 28 may be formed as a toggle button. Thus, the layer data may be fixed by a first operation and the fixation of the layer data may be released by a second operation. More specifically, for example, when the user operates the FIX layer button 28 and operates the SEL button 26 of one of the channel strips belonging to the block #1 in a state where the layer data of the block #1 are fixed, the one or more processors 14 release the fixation of the layer data of the block #1, and switch the layer data according to the operation of the layer switching buttons 40~48. In this manner, the user can temporarily fix the layer data with a simple operation.

The one or more processors 14 and the layer switching buttons 40~48 function as a layer setter in the present embodiment, and the one or more processors 14 and the FIX LAYER button 28 function as a layer fixer in the present embodiment.

Figure 5:
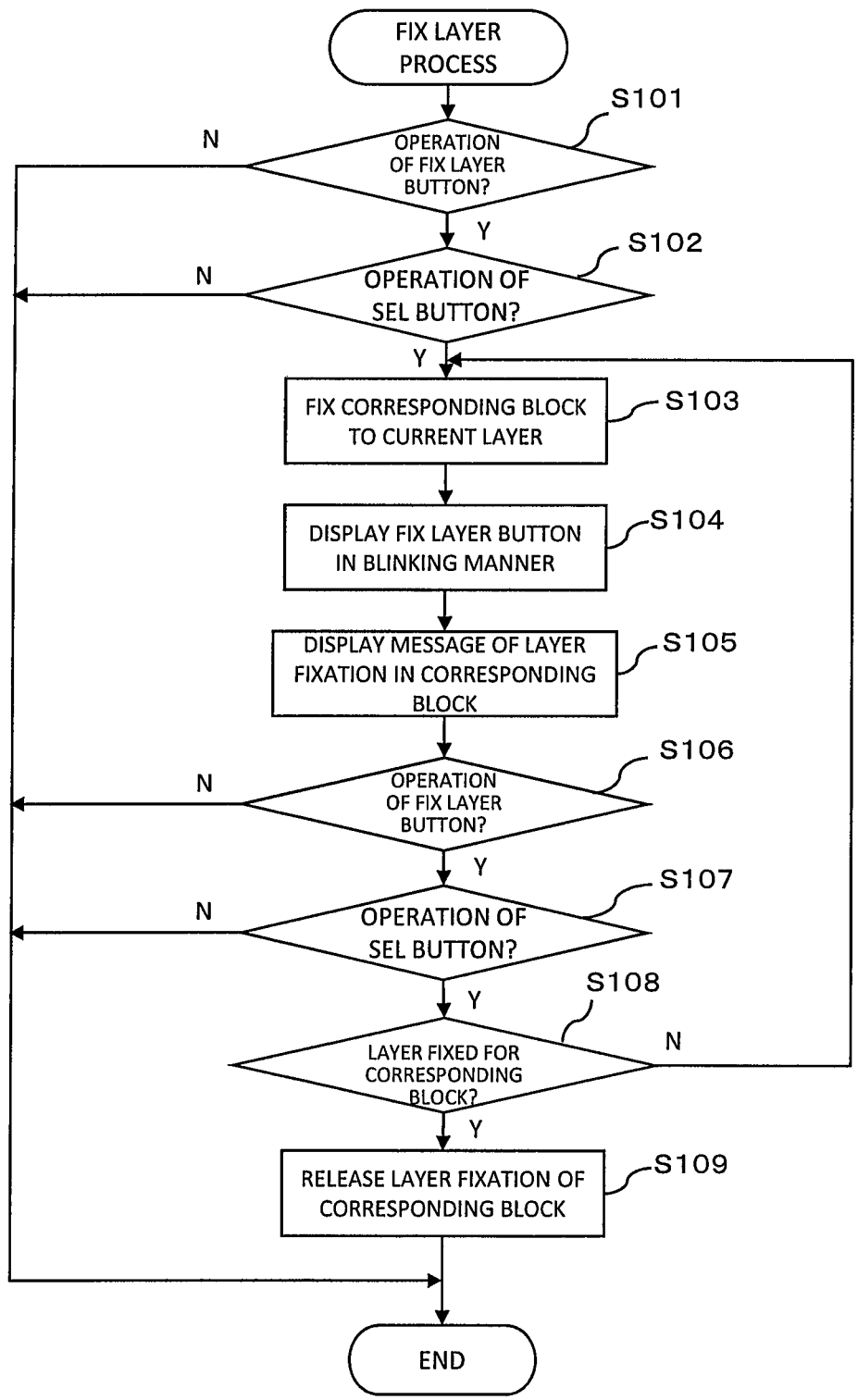
FIG. 5 is a process flowchart of a fix layer process in an embodiment of the present disclosure.

FIG. 5 shows a process flowchart of a layer fixing (FIX LAYER) process by the one or more processors 14. When the one or more processors 14 are formed from the CPU and the DSP, the flowchart may be executed by one of the CPU or the DSP, or by cooperation of the CPU and the DSP. The process flowchart of FIG. 5 is repeatedly executed at a predetermined control period.

First, the one or more processors 14 determine whether or not the FIX LAYER button 28 is operated (S101).

When the operation of the FIX LAYER button 28 is detected (YES in S101), the one or more processors 14 then determine whether or not the SEL button 26 is operated (S102).

When the operation of the SEL button 26 is detected (YES in S102), the one or more processors 14 fix the corresponding block selected by the SEL button 26 to the current layer (S103). That is, the layer data of the corresponding block are maintained at the current layer data. The one or more processors 14 then display an indicator of the FIX LAYER button 28 in a blinking manner, in order to notify the user that the layer data of the corresponding block is fixed (S104), and displays a message indicating that the layer is fixed for the corresponding block, on the display 20 (S105). The specific content of the message is arbitrary, and may be, for example, "the layer of this block is fixed".

When the layer switching buttons 40~48 are operated in this state, the one or more processors 14 maintain the channel of the corresponding block for which the layer is fixed, and switch only the layer of the block for which the layer is not fixed, according to the layer switching buttons 40~48.

Next, the one or more processors 14 determine whether or not the FIX LAYER button 28 is again operated (S106).

When the operation of the FIX LAYER button 28 is detected (YES in S106), the one or more processors 14 then determine whether or not the SEL button 26 is operated (S107).

When the operation of the SEL button 26 is detected (YES in S107), the one or more processors 14 further determine whether or not the block selected by the SEL button 26 is the corresponding block which is already selected in S102 and for which the layer is fixed in S103 (S108). When the block is the corresponding block for which the layer is already fixed, the layer fixation of the corresponding block is released (S109). When the layer is not fixed for any block, the one or more processors 14 turn OFF the indicator of the FIX LAYER button 28. On the other hand, when the selected block is not the corresponding block for which the layer is already fixed (NO in S108), the processes from S103 and on are repeated, and the layer of the selected block is newly fixed.

FIGS. 6-9 show an example operation of layer fixing (FIX LAYER) of the digital mixing console 10.

Figure 6:
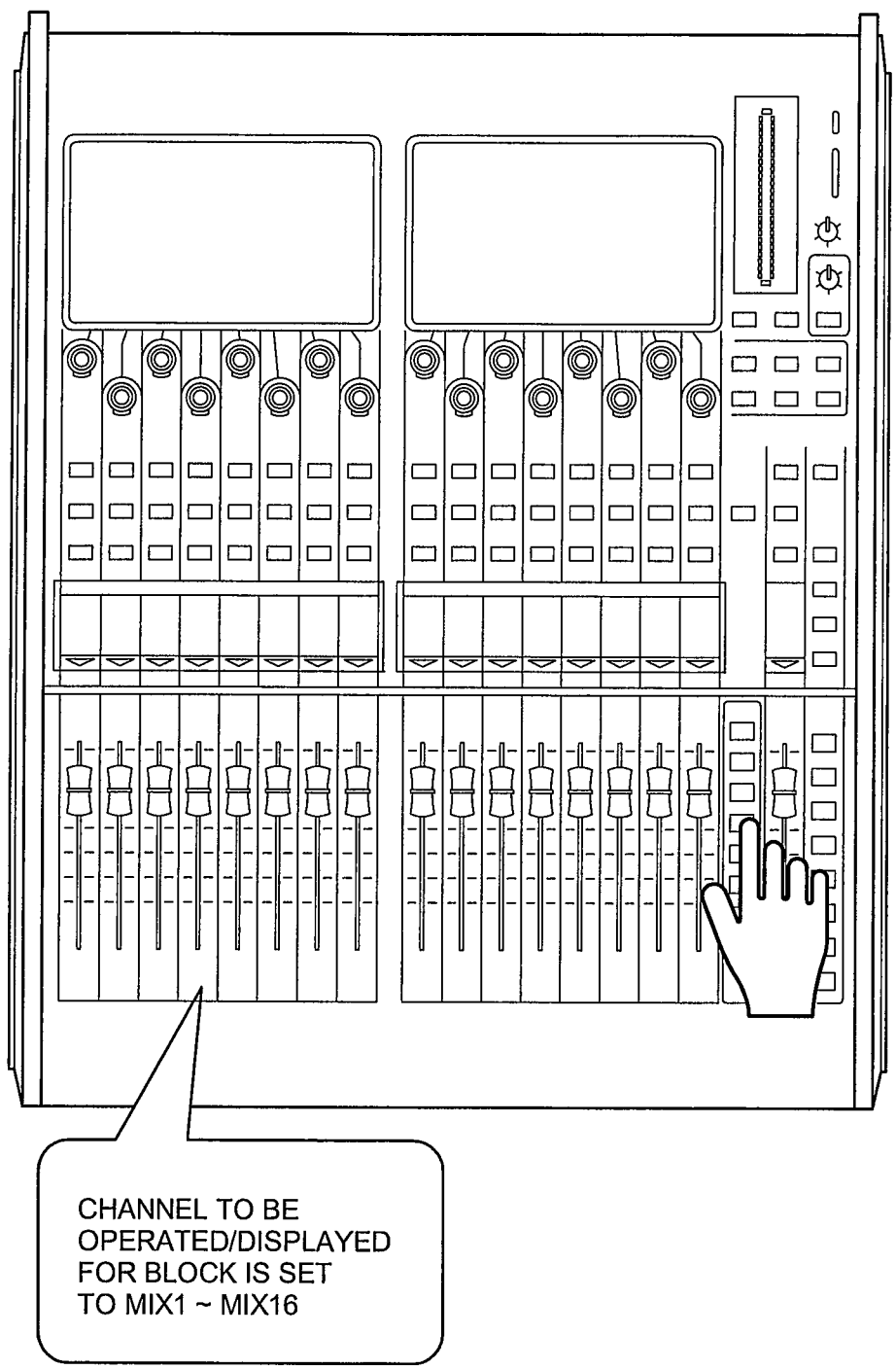
FIG. 6 is an explanatory diagram (part 1) of an action in an embodiment of the present disclosure.

FIG. 6 shows a case in which the user operates the OUTPUT1 among the layer switching buttons 40~48. When the one or more processors 14 detect the operation of the OUTPUT1, the one or more processors 14 display the following according to the layer data stored in the memory 16, and set these output channels as the channels to be operated and to be displayed:
Block #1: MIX1~MIX8
Block #2: MIX9~MIX16.

Figure 7:
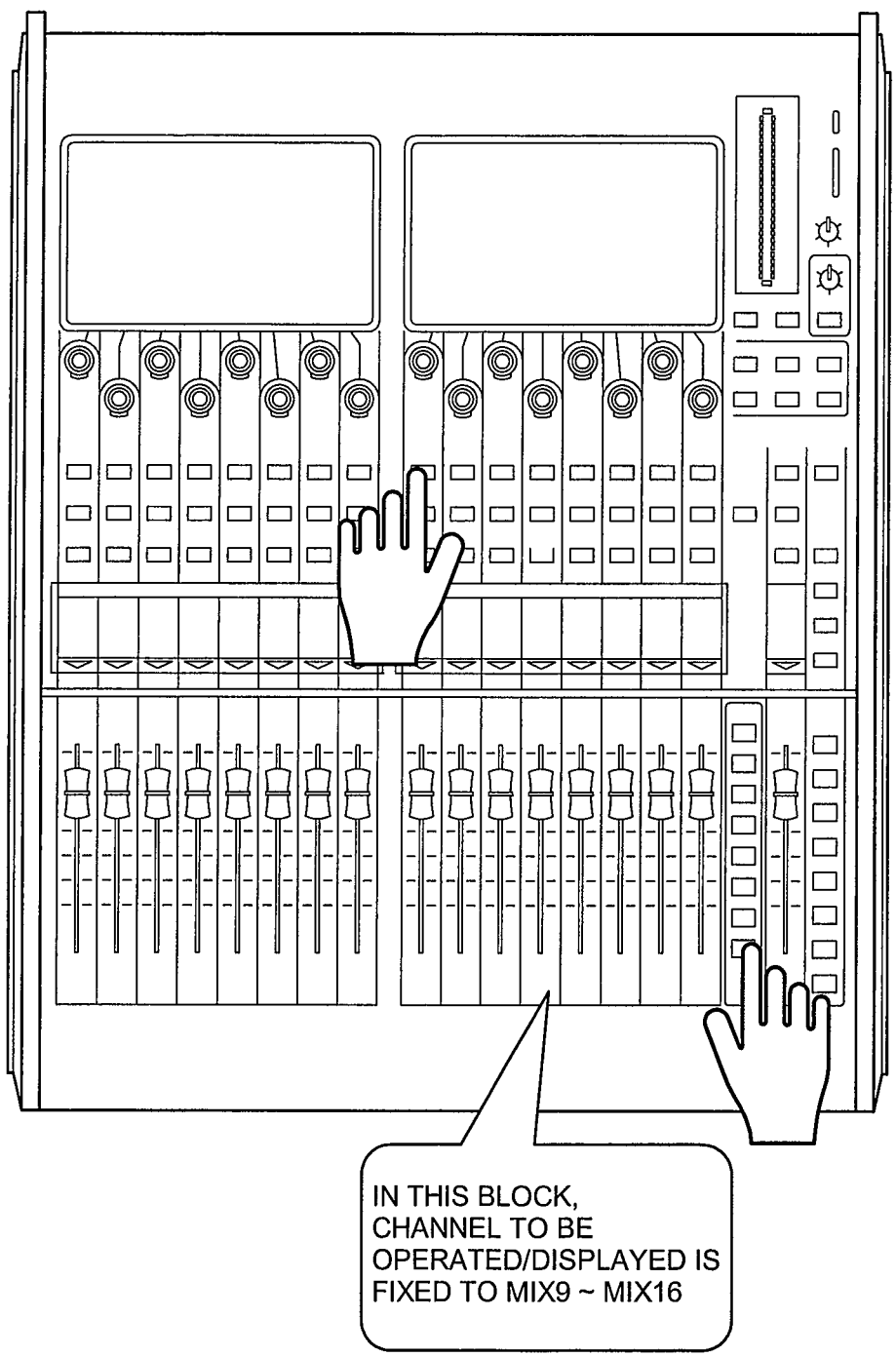
FIG. 7 is an explanatory diagram (part 2) of an action in an embodiment of the present disclosure.

FIG. 7 shows a case in which the user operates the FIX LAYER button 28, and then operates the SEL button 26 of one of the channel strips belonging to the block #2. When the one or more processors 14 detect these button operations, the one or more processors 14 fix the layer data of the corresponding block #2, and fix the channels to be operated and to be displayed for the block #2 to MIX9~MIX16.

Figure 8:
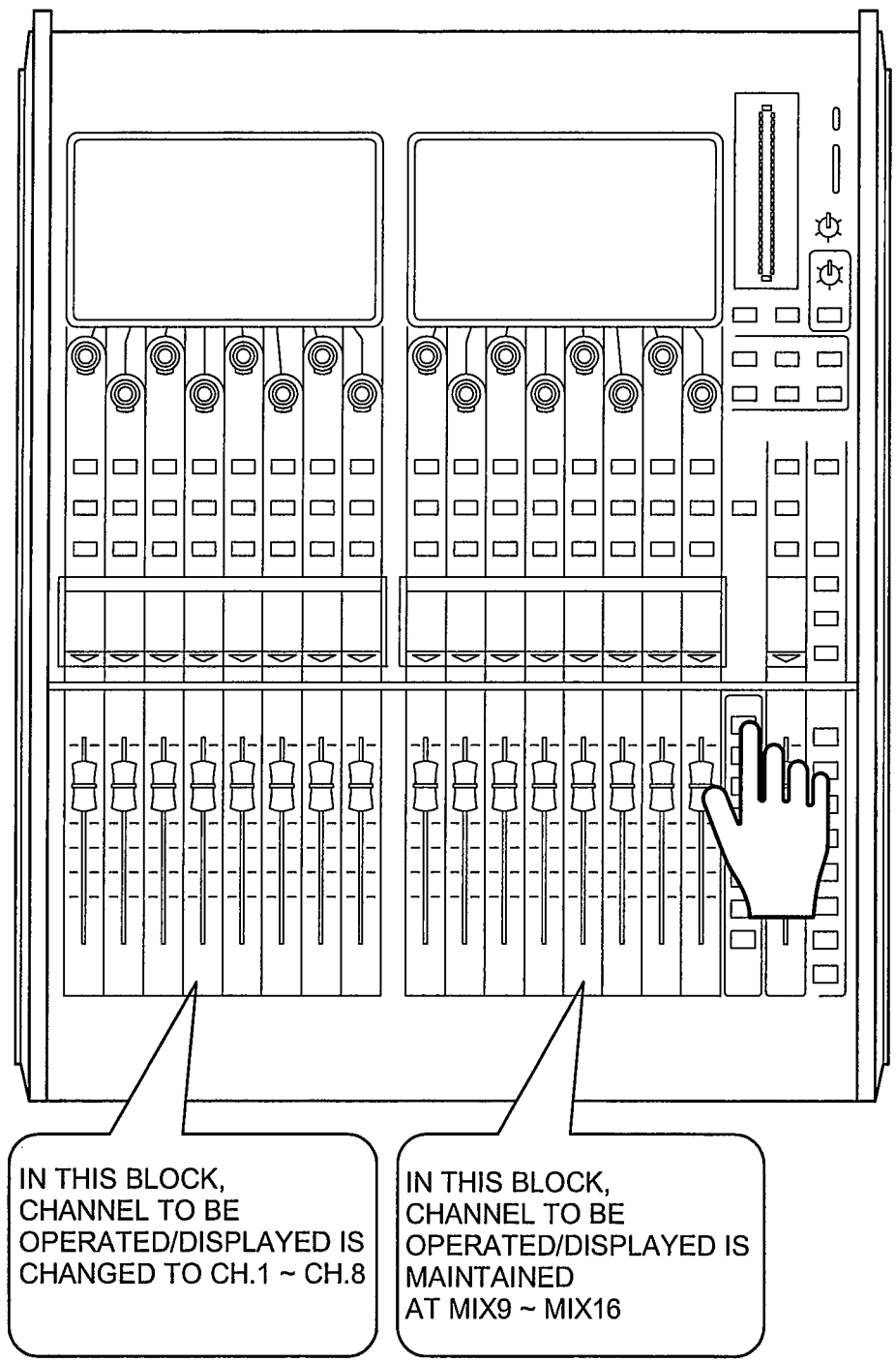
FIG. 8 is an explanatory diagram (part 3) of an action in an embodiment of the present disclosure.

FIG. 8 shows a case in which, after the layer data of the block #2 are fixed, the user operates the INPUT1 among the layer switching buttons 40~48. When the one or more processors 14 detect the operation of the INPUT1, the one or more processors 14 display the following according to the layer data stored in the memory 16, and set these input channels as the channels to be operated and to be displayed:
Block #1: ch. 1~ch. 8.

On the other hand, with regard to the block #2, because the layer data are fixed, the layer data stored in the memory 16 are regarded as invalid, and the current layer data are maintained. Therefore, the following data are maintained:
Block #2: MIX9~MIX16.

Figure 9:
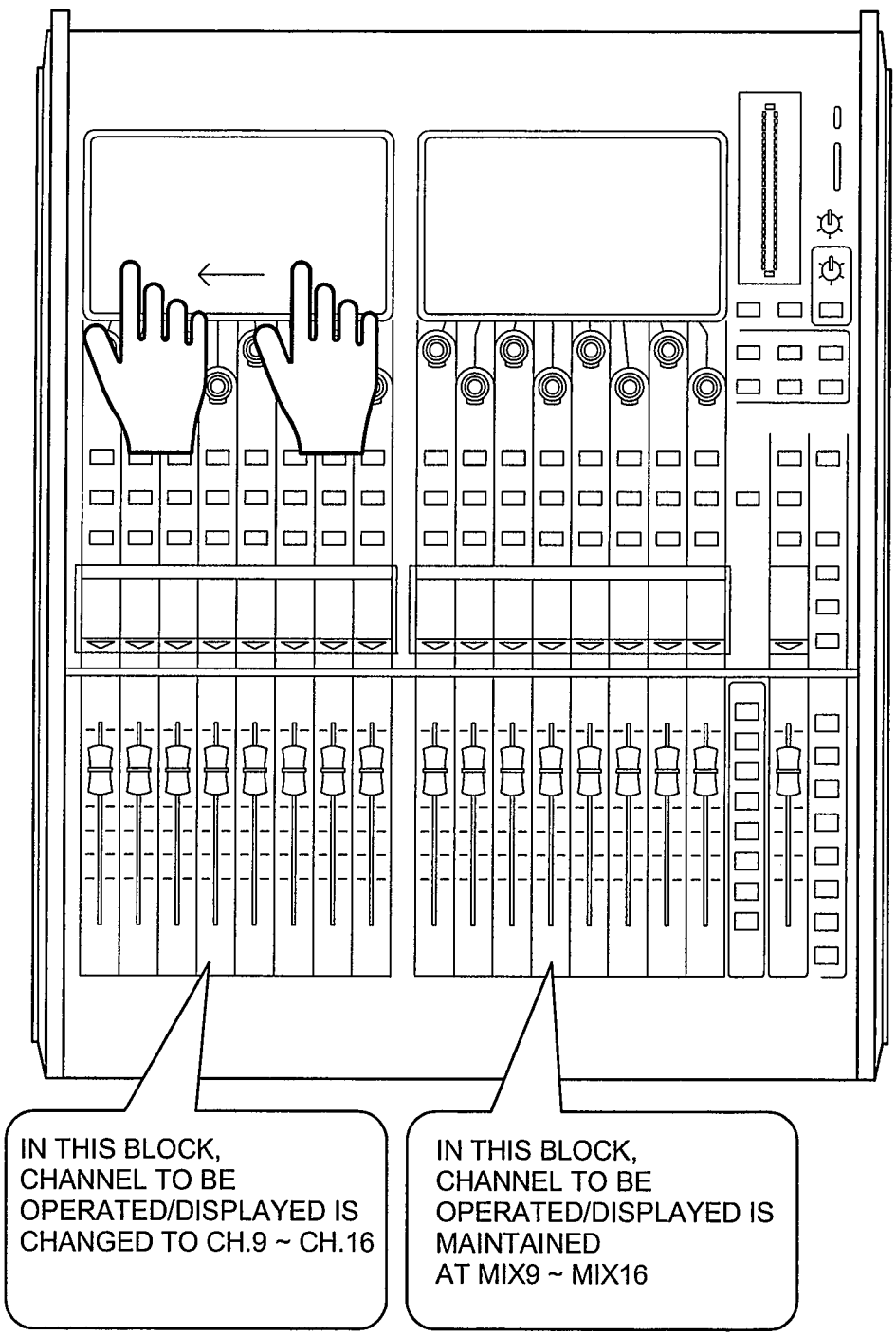
FIG. 9 is an explanatory diagram (part 4) of an action in an embodiment of the present disclosure.

FIG. 9 shows a case in which the user touches the display 20 corresponding to the block #1, and executes a lateral scroll operation (or a swipe operation). When the one or more processors 14 detect the lateral scroll operation of the display 20 corresponding to the block for which the layer data are not fixed, the one or more processors 14 accordingly shift the channels of the input channels by 8 channels, to display the following and newly sets these input channels as the channels to be operated and to be displayed:
Block #1: ch. 9~ch. 16.

With regard to the block #2, because the layer data are fixed, the following is maintained:
Block #2: MIX9~MIX16.

In FIG. 9, if the layer fix state of the block #2 is released, the one or more processors 14 shift, in addition to the block #1, the block #2 by 8 channels, to display the following and newly set these output channels as the channels to be operated and to be displayed:
Block #2: MIX17~MIX22.

In the case that the layer fix state is released, when the user touches the display 20 and executes the swipe operation, states of the two blocks, the block #1 and the block #2, are laterally scrolled together. For example, when swiped in the left direction, the channels of the block #2 are displayed in the block #1, and the subsequent corresponding channels are displayed in the block #2. More specifically, as a result of the display being swiped to the left in a state where the following is displayed:
Block #1: ch. 1~ch. 8
Block #2: ch. 9~ch. 16,
the following is displayed, and these input channels are set as the channels to be operated and to be displayed:
Block #1: ch. 9~ch. 16
Block #2: ch. 17~ch. 24.

Thus, in the case in which the layer fix state of the block #2 is released in FIG. 9, when swiped to the left while the following state is displayed:
Block #1: ch. 9~ch. 16
Block #2: MIX9~MIX16,
the following is displayed and these output channels are set as the channels to be operated and to be displayed:
Block #1: MIX9~MIX16
Block #2: MIX17~MIX22.

In this manner, by using both the layer fixing and the lateral scroll operation, the user can simultaneously set desired input channels and desired output channels as the operation target and the display target. In the present embodiment, for example, it is not necessary to provide layer switching buttons respectively for the block #1 and the block #2, and the layer switching buttons 40~48 which are common for both the block #1 and the block #2 are sufficient. Thus, the number of operation buttons can be reduced.

An embodiment of the present disclosure has been described. The present disclosure, however, is not limited to the embodiment described above, and various modifications are possible.

For example, in the above-described embodiment, the layer switching buttons 40~48 and the FIX LAYER button 28 are both formed as physical buttons, but alternatively, these buttons may be touch buttons displayed on a touch panel.

In addition, in the above-described embodiment, the channel strip portion is divided into two blocks; that is, the block #1 and the block #2, but alternatively, the channel strip portion may be divided into three or more blocks.

Further, in the above-described embodiment, the number of channel strips for each block is set to 8 channels, but the number may be set to 7 channels or fewer or 9 channels or more.

Alternatively, when the layer fix state is released, the arrangement of the channels may be returned to the arrangement with reference to the layer data of the block for which the layer is not fixed. That is, in the case in which the following is displayed while the layer data of the block #2 is fixed:
Block #1: ch. 9~ch. 16
Block #2: MIX9~MIX16,
when the layer fix state of the block #2 is released, the following may be displayed according to the layer data of the block #1 for which the layer is not fixed:

Block #1: ch. 9~ch. 16
Block #2: ch. 17~ch. 24.

The invention claimed is:

1. A mixing console which processes an audio signal in a plurality of channels, the mixing console comprising:
    an operator portion that includes a fix layer button;
    a channel strip portion that includes a plurality of channel strips, each of the channel strips having a first operator and a second operator which adjusts a parameter value for controlling an audio signal;
    a layer setter that divides the channel strip portion into a plurality of blocks and that sets layer data which define a channel to be operated and to be displayed for each of the blocks, wherein the plurality of blocks includes a first block and a second block; and
    a layer fixer that prohibits switching of the layer data to fix the layer data for each of the blocks,
    wherein, in response to operation of the fix layer button and operation of the first operator of one of the channel strips that is included in the first block, the layer fixer prohibits switching of the layer data of the first block, without prohibiting switching of the layer data of the second block, and
    wherein, in response to operation of the fix layer button and operation of the first operator of one of the channel strips that is included in the second block, the layer fixer prohibits switching of the layer data of the second block, without prohibiting switching of the layer data of the first block.

2. The mixing console according to claim 1, wherein
    the layer fixer switches the layer data of the first block and the second block according to an operation of the layer setter when the first block and the second block are not fixed; switches only the layer data of the second block according to an operation of the layer setter when the first block is fixed; and switches only the layer data of the first block according to an operation of the layer setter when the second block is fixed.

3. The mixing console according to claim 2, wherein
    the layer setter comprises:
        an input channel setter which sets an input channel to the first block and the second block; and
        an output channel setter which sets an output channel to the first block and the second block, and
    the layer fixer switches the layer data of the first block and the second block according to an operation of the layer setter when the first block and the second block are not fixed; switches only the layer data of the second block to an output channel setting according to an operation of the output channel setter when the first block is fixed to the input channel setting; and switches only the layer data of the first block to an input channel setting according to an operation of the input channel setter when the second block is fixed to the output channel setting.

4. The mixing console according to claim 3, wherein
    the layer fixer switches the layer data of the first block and the second block according to a scroll operation of a user when the first block and the second block are not fixed; switches only the layer data of the second block according to the scroll operation when the first block is fixed to the input channel setting; and switches only the layer data of the first block according to the scroll operation when the second block is fixed to the output channel setting.

5. The mixing console according to claim 2, wherein
    the layer fixer switches the layer data of the first block and the second block according to a scroll operation of a user when the first block and the second block are not fixed; switches only the layer data of the second block according to the scroll operation when the first block is fixed; and switches only the layer data of the first block according to the scroll operation when the second block is fixed.

6. The mixing console according to claim 1, wherein
    in response to operation of the fix layer button and operation of the first operator of one of the channel strips that is included in the first block, while the layer fixer prohibits switching of the layer data of the first block, the layer fixer enables switching of the layer data of the second block, and
    in response to operation of the fix layer button and operation of the first operator of one of the channel strips that is included in the second block, while the layer fixer prohibits switching of the layer data of the second block, the layer fixer enables switching of the layer data of the first block.

7. A mixing console which processes an audio signal in a plurality of channels, the mixing console comprising:
    an operator portion that includes a fix layer button;
    a channel strip portion that includes a plurality of channel strips, each of the channel strips having a first operator and a second operator which adjusts a parameter value for controlling an audio signal; and
    one or more processors, wherein the one or more processors are configured to, by executing a program stored in a memory:
        divide the channel strip portion into a plurality of blocks and set layer data which define a channel to be operated and to be displayed for each of the blocks, wherein the plurality of blocks includes a first block and a second block; and
        prohibit switching of the layer data to fix the layer data for each of the blocks,
    wherein, in response to operation of the fix layer button and operation of the first operator of one of the channel strips that is included in the first block, switching of the layer data of the first block is prohibited, without switching of the layer data of the second block being prohibited, and
    wherein, in response to operation of the fix layer button and operation of the first operator of one of the channel strips that is included in the second block, switching of the layer data of the second block is prohibited, without switching of the layer data of the first block being prohibited.

8. The mixing console according to claim 7, wherein
    the one or more processors are configured to:
        switch the layer data of the first block and the second block according to a user's operation of the layer setter when the first block and the second block are not fixed; switch only the layer data of the second block according to a user's operation of the layer setter when the first block is fixed; and switch only the layer data of the first block according to a user's operation of the layer setter when the second block is fixed.

9. The mixing console according to claim 8, wherein
    the one or more processors are configured to:
        set an input channel to the first block and the second block:
        set an output channel to the first block and the second block; and switch the layer data of the first block and the second block according to a user's operation of the layer setter when the first block and the second block are not fixed; switch only the layer data of the second block to an output channel setting according to a user's operation of the output channel setting when the first block is fixed to the input channel setting; and switch only the layer data of the first block to an input channel setting according to a user's operation of the input channel setting when the second block is fixed to the output channel setting.

10. The mixing console according to claim 9, wherein the one or more processors are configured to: switch the layer data of the first block and the second block according to a scroll operation of a user when the first block and the second block are not fixed; switch only the layer data of the second block according to the scroll operation when the first block is fixed to the input channel setting; and switch only the layer data of the first block according to the scroll operation when the second block is fixed to the output channel setting.

11. The mixing console according to claim 8, wherein the one or more processors are configured to: switch the layer data of the first block and the second block according to a scroll operation of a user when the first block and the second block are not fixed; switch only the layer data of the second block according to the scroll operation when the first block is fixed; and switch only the layer data of the first block according to the scroll operation when the second block is fixed.

12. The mixing console according to claim 7, wherein the one or more processors are configured to:
   in response to operation of the fix layer button and operation of the first operator of one of the channel strips that is included in the first block, while switching of the layer data of the first block is prohibited, switching of the layer data of the second block is enabled, and
   in response to operation of the fix layer button and operation of the first operator of one of the channel strips that is included in the second block, while switching of the layer data of the second block is prohibited, switching of the layer data of the first block is enabled.

* * * * *